United States Patent [19]
Hanson et al.

[11] 3,744,297
[45] July 10, 1973

[54] APPARATUS FOR MONITORING SUSPENDED AEROSOLS AND PARTICULATES IN A GAS

[75] Inventors: Jack Orvel Hanson, Wayne; Robert Martin Ross, Radnor, both of Pa.

[73] Assignee: General Electric Company, New York, N.Y.

[22] Filed: Oct. 12, 1971

[21] Appl. No.: 187,986

[52] U.S. Cl. .................................. 73/28, 73/432 PS
[51] Int. Cl. ............................................ G01n 15/00
[58] Field of Search ............... 73/28, 324, 61, 67.2, 73/194 B, 432 PS; 177/1, 210

[56] References Cited
UNITED STATES PATENTS

| | | | |
|---|---|---|---|
| 3,653,253 | 4/1972 | Olin | 73/28 |
| 2,508,543 | 5/1950 | Sebok | 73/28 X |
| 3,572,098 | 3/1971 | Fogwell | 73/67.2 |
| 2,063,775 | 12/1936 | Wilhelmi | 73/28 |
| 3,011,572 | 12/1961 | Bellier | 177/210 X |
| 3,519,053 | 7/1970 | Ramsay | 177/210 X |
| 3,583,209 | 6/1971 | Banks | 73/432 PS |

Primary Examiner—Richard C. Queisser
Assistant Examiner—Stephen A. Kreitman
Attorney—Allen E. Amgott, William G. Becker et al.

[57] ABSTRACT

Apparatus for monitoring suspended aerosols and solid particulates in a gas. The apparatus consists basically of a filter in a spring-mounted holder, means such as a pump for moving gas through the filter, means for causing the filter assembly to oscillate substantially in a horizontal plane, means for measuring the period of oscillation of the filter assembly and for comparing the period measured to the tare period of oscillation, and means for converting the period difference into an indication of the mass added to the filter during the sampling period. In its preferred embodiment the apparatus includes means for assuring that the filter and matter collected thereon have sufficiently low moisture content during the weighing operation.

4 Claims, 4 Drawing Figures

APPARATUS FOR MONITORING SUSPENDED AEROSOLS AND PARTICULATES IN A GAS

BACKGROUND OF THE INVENTION

The subject invention relates to the field of collection of suspended aerosols and particulates in a gas sample and, in particular, to the monitoring of such aerosols and particulates on an automatic basis.

In recent years added emphasis has been placed on the control of pollutants, both gaseous and solid, in the air. In order to provide effective control over pollutants it is usually first necessary to accurately monitor the presence of such pollutants. Also, in many industiral applications it is necessary to monitor the presence and concentration of particulate matter in a gaseous medium. Generally, monitoring of particulates in a gaseous medium is accomplished by moving a sample of the gas through a stationary filter, removing the filter from the apparatus, weighing it and comparing its weight to that of the filter before it was installed in the apparatus. Very low concentrations of particulate matter may be measured by causing the particulates in a gaseous sample to contact a sampling surface which is then examined under a conventional optical or electron microscope. Also, various optical techniques, some of which use such sophisticated equipment as lasers, have been developed to monitor certain types of airborne pollutants.

While particulate monitoring is possible with prior art devices, improvements in accuracy, simplicity, automation and cost are still highly desirable.

SUMMARY OF THE INVENTION:

Therefore it is an object of the subject invention to provide an improved apparatus for monitoring aerosols and particulates in a gaseous atmosphere;

another object is to provide apparatus for automatically monitoring aerosols and particulates in a gaseous medium on a preselected or periodic basis; and yet another object of the subject invention is to provide apparatus for monitoring aerosols and particulates in a gaseous medium.

The above-mentioned objects are satisfied in the subject invention by providing apparatus which is comprised of a filter assembly including a filter and a spring-mounted filter holder, means for moving the gas to be sampled through the filter, means for oscillating the filter assembly in a substantially horizontal plane, means for measuring the oscillation period of the filter assembly and comparing it to the tare oscillation period, and means for converting the difference in oscillation periods to an indication of the weight gain of the filter. Also it is preferable to provide means for assuring that the moisture content of the filter and the material collected thereon is of a sufficiently low moisture content, such as by heating the filter to vaporize moisture therein prior to weighing it.

The subject matter which is regarded as the present invention is particularly pointed out and distinctly claimed in the concluding portion of this specification.

BRIEF DESCRIPTION OF THE DRAWINGS

The present invention, however, both as to organization and method of operation, together with further objects and advantages thereof may best be understood by reference to the following description taken in connection with the accompanying drawings in which.

DESCRIPTION OF THE PREFERRED EMBODIMENTS

Figure 1:
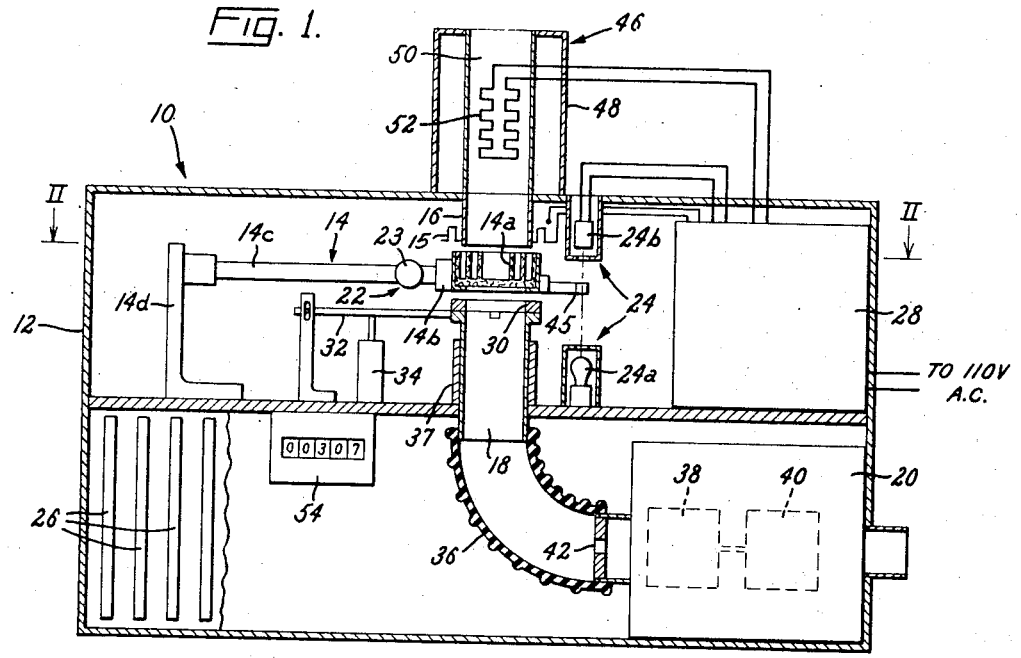
FIG. 1 is a side sectional view of a monitor in accordance with the subject invention.
Figure 2:
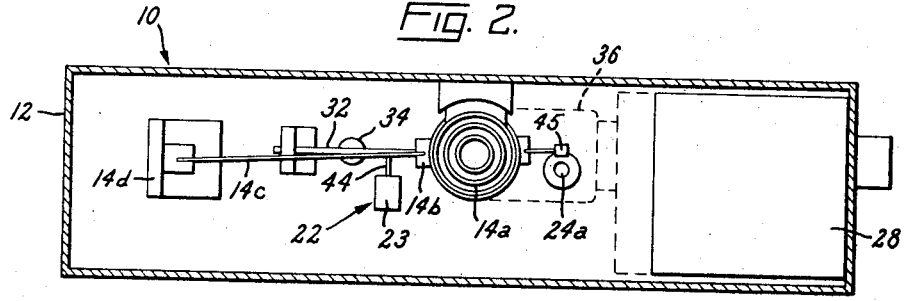
FIG. 2 is a top sectional view of the apparatus shown in FIG. 1 taken along the line denoted II—II.

In FIGS. 1 and 2 are side and top views, respectively, of a preferred embodiment of monitor 10 in accordance with the subject invention. Monitor 10 is to be used to collect and provide an indication of the concentration of suspended matter in a gaseous medium. Suspended matter as used in the specification and claims is intended to include any non-gaseous material capable of being collected onto a filter such as suspended aerosols and solid particulates. While the gaseous medium with which the monitor is to be used is generally air, the apparatus of the subject invention is applicable for use in other gaseous mediums.

Monitor 10 is basically comprised of a casing 12, a filter assembly 14, conduit means 16, 18 for ducting the gas to be sampled; pumping means 20 for moving the gas to be sampled through conduit means 16, 18; means 22 for causing oscillation of filter assembly 14; means 24 for sensing the period of oscillation of filter assembly 14; electrical means 26 connected to sensing means 24 for operating sensed data and computing output data therefrom and timing means 28 for controlling the operation of monitor 10.

Filter assembly 14 is comprised of a filter 14a, a holder 14b for the filter, a cantilever beam 14c which is connected to holder 14b to provide a spring mounting therefore, and a mounting bracket 14d which is rigidly connected to beam 14c to provide a rigid support therefor. Filter 14a is preferably a commercially available high efficiency glass fiber filter but may be made of any other suitable filter material such as open cell foam, sintered glass, membrane fibers, organic polymer, carbon fibers, etc.

The gas conduits include inlet conduit 16 which extends up to an aperture in casing 12 and has its downstream end located adjacent the top surface of filter 14a; moveable conduit 18 which has a gas tight seal 30 at the upstream end thereof and a flexible tube 36 which connects the downstream end of conduit 18 to the input of pumping means 20. Conduit 18 is attached to an actuating linkage 32 which in turn can be actuated by a seal engaging solenoid 34. A guide 37 is disposed about a portion of conduit 18 to permit seal 30 to effectively engage the lower surface of filter 14a when solenoid 34 is actuated.

Means 20 for moving the gas through the conduits andfilter may conveniently be comprised of a vacuum pump 38 and a motor 40. A restricted orifice 42 is provided in the input to pump 38 to help maintain a substantially uniform gas flow rate through the filter and conduits. Control of the flow rate through the monitor can be effected by controlling the speed of motor 40. A flow meter (not shown) may be installed in an input conduit such as tube 36 and connected to the speed control to effect accurate control of the flow rate through the filter, if desired.

Means 22 for causing filter assembly 14 to oscillate is comprised of an actuating solenoid 23 which is connected to cantilver beam 14c by a linkage 44. Actuating solenoid 23 is preferably disposed in a horizontal plane so as to cause filter assembly 14 to oscillate in a substantially horizontal plane. Solenoid 23 is electrically connected to and its actuation controlled by timing means 28.

Means 24 for sensing the oscillation frequency of filter assembly 14 is comprised of a light source 24a, a photodiode 24b, and an optical chopper 45 which is rigidly attached to filter holder 14b. Oscillation of filter assembly 14 causes chopper 45 to periodically attenuate the light coming from light source 24a to photodiode 24b. The voltage output of photodiode 24b will therefore vary in amplitude at the same frequency as the oscillation frequency of the filter assembly 14. The output of photodiode 24b is electrically connected to timing means 28 and the electrical means 26 which provide the necessary computations. Means 26 and 28 comprise the mechanical and electrical components used for controlling the sequencing of operations of the monitor and for processing the information received to provide an output indicative of the weight gain of filter 14a which is, of course, due to a collection of suspended matter on filter 14a. One embodiment of means 26 and 28 is described in detail with respect to FIG. 4.

Where the relative humidity of a gas being collected is greater than 55 percent, it has been found that the weight of the collected material will be markedly affected (G. P. Tierney and W. D. Conner, "Hygroscopic Effects on Weight Determinations and Particulates Collected on Glass Fiber Filters," Amer. Ind. Hyg. Association, July 1967, pp. 363–365). Therefore, the subject invention in its preferred form also provides means 46 for lowering the moisture content of the filter material and the matter collected thereon. In FIG. 1, the removal of moisture is accomplished by heating the gas to be sampled just prior to its exposure to the filter material by the use of means 46. Means 46 is shown in FIG. 1 as being comprised of an enclosure 48 having a through passageway 50 in alignment with the input end of conduit 16 and a resistance heater 52 located in passageway 50. Of course, other suitable heating means may be used to heat the gas prior to its contact with filter 14 or, alternatively, filter 14 could be heated directly by any conventional means, such as, for example, radiant heater 15. Any other means of maintaining the low moisture content, such as the use of desicants, may alternatively be utilized.

Figure 3:
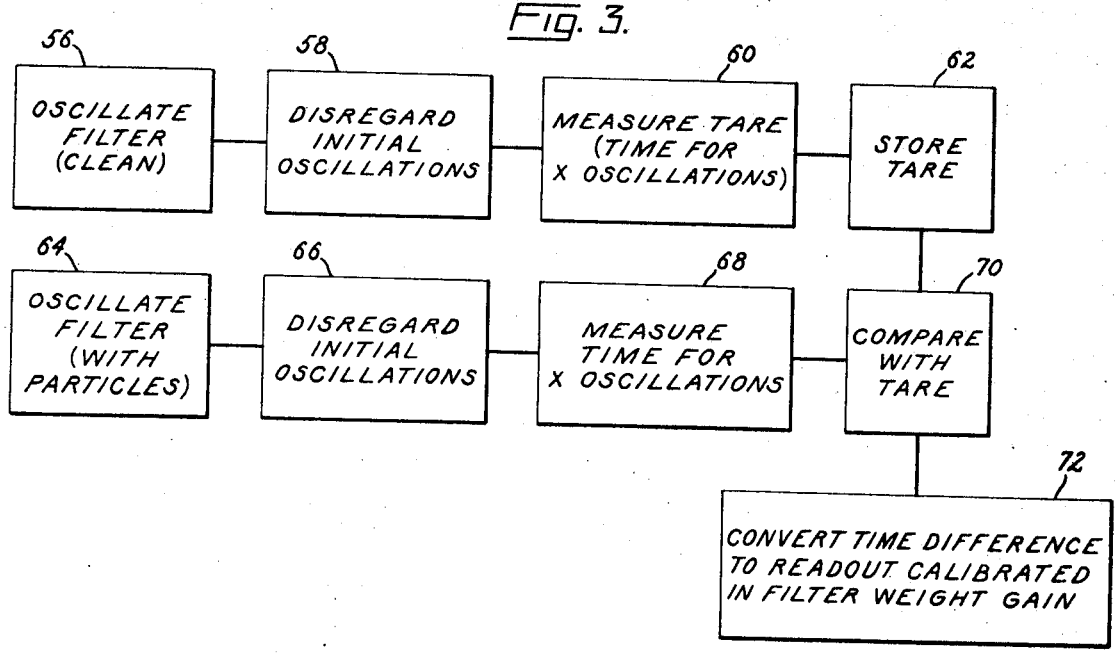
FIG. 3 is a simplified process step diagram of a monitoring process in accordance with the subject invention.

FIG. 3 is a block diagram of a preferred process embodiment in accordance with the subject invention. After a clean filter is inserted in the holder and before the seal engaging solenoid 34 is actuated, solenoid 23 is actuated so as to cause filter assembly 14 to oscillate 56 in a substantially horizontal plane. Oscillation in a horizontal plane is preferred as it minimizes any effect due to gravity. As assembly 14 oscillates, light to photodiode 24b is periodically interrupted by optical chopper 45 which is connected to the assembly so that an electrical output from photodiode 24b is produced whose amplitude varies at the same frequency as the frequency of oscillation of the filter assembly. An initial number of cycles are disregarded 58 to allow unwanted transients to damp out. The period of oscillation of filter assembly 14 is then measured 60, for example, by measuring the time necessary for a preset number of oscillations to transpire. The period of oscillation is, of course, the reciprocal of the frequency of oscillation. The data indicative of the measured period of oscillation of the filter assembly with clean filter is then stored 62. This value is called tare. When the sampling is to begin, pump 38 is actuated and seal 30 of conduit 18 is allowed to engage the underside of filter 14a so that only the gas to be sampled is pulled through filter 14a and the gas sampling conduit system.

The gas will be pulled through the inlet of passageway 50. Heating element 52 may be energized during the entire gas sampling, or, alternatively, may be energized no less than five minutes before the pump is to be stopped and the filter assembly weighed. It should be noted that the sampling system is controlled to provide a substantially constant flow rate through the filter which can be preset within a given range. When the sampling time is completed, solenoid 34 is actuated so as to disengage seal 30 from filter 14a, and solenoid 23 is actuated so as to cause filter assembly 14 to oscillate 64. As before, an initial number of oscillations are premitted to occur 66 before measurement of the period of oscillation. The period of oscillation is measured 68 the same way the tare had been measured and the resulting period of oscillation data of the filter assembly with the used filter is compared with the tare 70. The difference between tare and the measured period of oscillation is then converted to an output signal 72 which is proportional to the amount of mass added to the filter. The output may be expressed in any convenient form, such as a digital output 54 (shown in FIG. 1) meter reading, strip chart or magnetic recording.

The mathematical basis for the operation of the wieighng system can best be explained by making a simplifying assumption that the cantilever is massless and that the mass, M. is equal to the mass of the filter and holder plus half of the mass of the actual cantilever. Therefore, the period of osciallation $T_o = 2\pi \sqrt{M_o/K}$, where $K$ is a form of spring constant which can be obtained experimentally.

If the mass is increased by $\Delta M$, the period of oscillation becomes $$T_M = 2\pi \sqrt{(M_o/K) + \Delta M}.$$

The change in period $\Delta T = T_M - T_o$ which equals $(2\pi/\sqrt{K})(\sqrt{M_o + \Delta M} - \sqrt{M_o})$.

Consequently $\Delta T = 2\pi \sqrt{(M_o/K)} (\sqrt{1 + (\Delta M/M_o)} - 1\ 1)$. M/M Using numerical methods this becomes $$\Delta T = T_o ((\Delta M/2M_o) - (1/8)(\Delta M/M_o)^2 + 1/16 (\Delta M/Mhd\ o))^3 \ldots)$$

If $\Delta M$ is much smaller than $M_o$ then $$\Delta T \approx (T_o \Delta M/2M_o)$$

Thus for practical purposes the change in mass is linearly proportional to the change in period of oscillation. Experimentally it has been found that for an original $M_o$ of approximately the accuracy grams the accuracy of the output of the monitor is within 1 percent for a change in mass of 1 gram or less.

Figure 4:
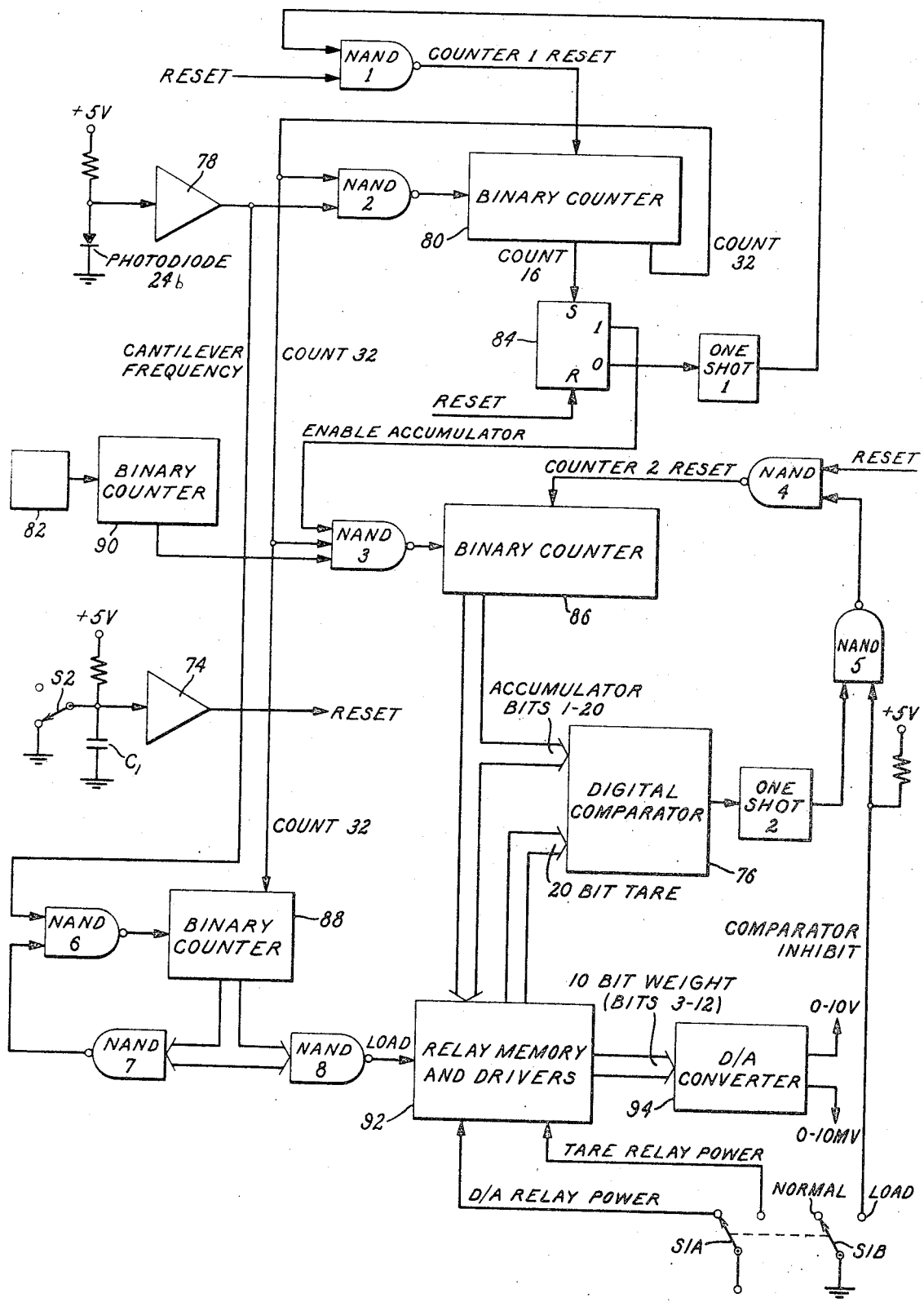
FIG. 4 is a block diagram of an embodiment data storage and calculating portion of the subject invention.

In FIG. 4 a block diagram of the electronics of means 26 and 28 which are used to control operation of the monitor, operate on sensed data, and compute output data is shown.

Standard TTL (transistor-transistor logic) integrated circuits can conveniently be used to implement the logic The analog comparators and piece parts described can be standard commercially available items. Dual coil latching reed relays which can be driven directly from the logic, may be used in the relay memory. An example of how the electronics may operate is described below:

In the operation of the reset switch, S2 (shown in the standby position) which is located on a reset relay (not shown), is used to remove the reset signal at the beginning of the measurement sequence. The reset relay is energized coincidentally with the actuating solenoid 23 and, after a delay of 0.1 second, capacitor $C_1$ charges analog comparator 74, threshold and the reset signal is removed. Thus, the system is held in a standby mode until all of the high power switching transients have occurred. At the end of the sequence, actuating solenoid 23 and reset relay are de-energized and the system returns to the standby mode.

As discussed above, tare, which is indicative of the weight of the unused (clean) filter must be determined and stored by the electronics before a normal weighing operation can take place. S1 A&B (shown in the normal position) is manually placed in the load position. This applies power to the 20 tare relays in the memory and inhibits the 20 bit digital comparator 76 output at NAND 5 to preclude any initial tare memory contents from interrupting the sequence. After the cantilever has been activated and system reset removed, the photodiode-analog comparator 78 circuit provides a square wave of the same frequency as the cantilever oscillation. This signal drives binary counter 80, used to both discard the first 16 cantilever cycles and gate the crystal oscillator 82 through NAND 3 during the next 32 cycles. At the 16th count, the count 16 output goes low and sets the control flip flop 84. The zero output of flip flop 84 triggers one shot 1, resetting the cantilever cycle count back to zero through NAND 1. At the same time, the one output of flip flop 84 enables NAND 3, starting the 20 bit time count accumulater 86 (binary counter). Binary counter 80 continues to count to 32 (no signals are generated by the count 16 output the second time) at which time the count 32 goes low. This disables counter 80 at NAND 2 and counter 86 via NAND 3. The count 32 output also starts binary counter 88. In the meantime, crystal oscillator 82 has been gated into counter 86. Oscillator 82 operates at 320 KHz and is counted down to 16 KHz in counter 90 before it is gated into counter 86. The number of counts accumulated during the 32 cantilever cycles corresponds to the period of oscillation of the filter assembly and is therefore indicative of the filter tare weight. Finally, the load sequence counter (counter 88) generates a load signal (via NAND 8) to the memory 92 and the contents of binary counter 86 are transferred to the tare latching relays in memory 92 (only the tare relays are energized by S1). Counter 88 generates another signal to turn itself off through NAND 6 and NAND 7 and the sequence is complete.

For a normal measurement, S1 is placed in the normal position, enabling comparator 76 output at NAND 5 and energizing the D/A relays in memory 92. During this sequence, operation of the counter 80, control flip-flop 84, and load sequence counter 88 are the same. However, as the particulate weight increases, the cantilever oscillates slower and the 32 cycle measurement interval becomes longer. Thus, more 16 KHz counts are accumulated in time counter accumulator 86. The original 20 bit tare accumulation is fed to comparator 76 by the tare relay contacts (even though the tare relays are not energized, the contacts retain the tare information). When the outputs of the 20 bit accumulation (which are also fed to digital comparator 76) are equal to the 20 bit tare, digital comparator 76 triggers one shot 2, resetting counter 86 back to zero through NAND's 4 and 5. The additional 16 KHz count accumulation, corresponding to the particulate weight, is then counted from zero and can be directly transferred to the D/A (Digital to Analog) converter 94. The first 12 bit outputs of counter 86 correspond to a 1 gram nominal full scale, so bits 3 through 12 are fed to D/A converter 94 giving a ± ½ milligram output resolution. Consequently, bits 3–12 are loaded into the D/A latching relays in memory 92 at the end of the measurement cycle (only the D/A relays are energized by S1).

The above-mentioned components and their operation are included only as an example of one way in which the weight gain due to collection of suspended matter on the filter can be measured.

It is obvious that many modifications may be made to the apparatus disclosed herein within the true scope and spirit of the invention. For example, the filter and filter holder can be spring mounted in any one of the number of configurations. As examples, instead of using a cantilever beam, the filter holder can be mounted in the middle of a spring-type beam fixed at both ends or the filter holder and filter can be attached to a rigid rod pivoted at one end with one or more coil springs horizontally positioned with one end fixed and the other end fixably attached to the rod or filter holder. Also, initiation of oscillation may be effected by any one of a number of means other than the electrical solenoid arrangement discussed above including a spring loaded mechanical actuator, a fluid actuator or any type of electrical or magnetic actuator. While it is preferred to have the filter assembly oscillate freely after initial actuation, as is well known in the art continuous actuation at the filter assembly's natural frequency of oscillation can be achieved using state of the art electrical components. Also, the period of oscillation of the filter assembly can be sensed by the use of other optical means, electrical, mechanical, or fluid apparatus. For example, movement of a portion of the filter assembly in a magnetic field will cause an electrical signal to be generated whose frequency is the frequency of oscillation of the filter assembly. Another alternative is to allow a portion of the filter assembly to interrupt a fluid stream from a supply nozzle to a receiver passageway when the filter assembly oscillates so as to produce a fluid output signal having a pulsation frequency equal to that of the frequency of oscillation. If a pressure transducer is used in the receiver passageway the fluid pulsations can be converted to an electrical signal whose frequency is the same as the frequency of oscillation of the filter assembly. Of course, many other designs of electrical circuits or mechanical apparatus may be used to compare the period of oscillation of the filter assembly after sampling occurs with tare. While this specification discloses that the period of oscillation can be obtained by measuring the time necessary for a preset number of oscillations to occur, it is obvious that the frequency of oscillation can be obtained by counting the number of cycles which occur within a preset time interval.

Thus, it is intended that the subject invention be limited only by the following claims.

What is claimed and desired to be secured by Letters Patent of the United States is:

1. Apparatus for monitoring particulates in a gas comprised of:
    a. a filter rigidly attached to a spring mounted holder assembly;
    b. means for moving the gas to be sampled through said filter;
    c. means for causing said holder assembly to oscillate substantially in a horizontal plane; and
    d. means for measuring the period of oscillation of said holder assembly and filter.

2. Apparatus as in claim 1 further including means for computing the weight gain of the filter.

3. Apparatus as in claim 1 further including means for heating said filter.

4. Apparatus as in claim 3 wherein said filter heating means includes means for heating the gas prior to its contact with said filter.

* * * * *